(12) United States Patent
Peters et al.

(10) Patent No.: US 11,752,837 B1
(45) Date of Patent: Sep. 12, 2023

(54) PROCESSING VAPOR EXHAUSTED BY THERMAL MANAGEMENT SYSTEMS

(71) Applicant: Booz Allen Hamilton Inc., McLean, VA (US)

(72) Inventors: Joshua Peters, Knoxville, TN (US); Igor Vaisman, Carmel, IN (US)

(73) Assignee: Booz Allen Hamilton Inc., McLean, VA (US)

( * ) Notice: Subject to any disclaimer, the term of this patent is extended or adjusted under 35 U.S.C. 154(b) by 54 days.

(21) Appl. No.: 16/684,775

(22) Filed: Nov. 15, 2019

(51) Int. Cl.
| | | |
|---|---|---|
| *B64D 33/04* | (2006.01) | |
| *B60H 1/32* | (2006.01) | |
| *B60H 1/00* | (2006.01) | |
| *F01P 3/20* | (2006.01) | |
| *F02K 7/00* | (2006.01) | |
| *F02C 7/16* | (2006.01) | |
| *F02K 9/00* | (2006.01) | |
| *F02K 3/11* | (2006.01) | |

(52) U.S. Cl.
CPC ....... *B60H 1/3205* (2013.01); *B60H 1/00899* (2013.01); *B64D 33/04* (2013.01); *F01P 3/20* (2013.01); *F02C 7/16* (2013.01); *F02K 3/11* (2013.01); *F02K 7/00* (2013.01); *F02K 9/00* (2013.01)

(58) Field of Classification Search
CPC ... F02K 1/28; F02K 1/825; F02K 9/82; F23R 3/20; F23R 3/18; F02C 7/12; B64D 33/04
See application file for complete search history.

(56) References Cited

U.S. PATENT DOCUMENTS

| | | |
|---|---|---|
| 1,836,318 A | 12/1931 | Gay |
| 2,489,514 A | 11/1949 | Benz |
| 2,526,221 A | 10/1950 | Goddard |
| 2,785,540 A | 3/1957 | Biehn |
| 3,300,996 A | 1/1967 | Atwood |
| 3,468,421 A | 9/1969 | Hazel et al. |
| 3,542,338 A | 11/1970 | Scaramucci |
| 3,685,310 A | 8/1972 | Bitter et al. |
| 3,789,583 A | 2/1974 | Smith |
| 3,866,427 A | 2/1975 | Rothmayer et al. |
| 4,015,439 A | 4/1977 | Stern |
| 4,016,657 A | 4/1977 | Passey |

(Continued)

OTHER PUBLICATIONS

U.S. Appl. No. 16/448,196, filed Jun. 21, 2019, Vaisman et al.

(Continued)

*Primary Examiner* — Gerald L Sung
(74) *Attorney, Agent, or Firm* — Fish & Richardson P.C.

(57) ABSTRACT

Disclosed is a mechanism to exhaust refrigerant vapor resulting from operation of a thermal management system that is used to cool a thermal load by a vehicle, such as an airborne vehicle. The thermal management system includes an open circuit refrigeration system featuring a receiver configured to store a liquid refrigerant fluid, an evaporator configured to extract heat from the thermal load that contacts the evaporator, and an exhaust line, where the receiver, the evaporator, and the exhaust line are connected to provide an open refrigerant fluid flow path. Other implementations of open circuit refrigeration systems include the use of a gas receiver, a pump and an ejector are also described, as are other mechanisms to exhaust refrigerant vapor resulting from operation of the thermal management system.

36 Claims, 10 Drawing Sheets

(56) References Cited

U.S. PATENT DOCUMENTS

| | | | |
|---|---|---|---|
| 4,054,433 | A | 10/1977 | Buffiere et al. |
| 4,151,724 | A | 5/1979 | Garland |
| 4,169,361 | A | 10/1979 | Baldus |
| 4,275,570 | A | 6/1981 | Szymaszek et al. |
| 4,323,109 | A | 4/1982 | Jaster |
| 4,352,272 | A | 10/1982 | Taplay |
| 4,419,865 | A | 12/1983 | Szymaszek |
| 4,539,816 | A | 9/1985 | Fox |
| 4,870,830 | A | 10/1989 | Hohenwarter et al. |
| 4,969,495 | A | 11/1990 | Grant |
| 5,094,277 | A | 3/1992 | Grant |
| 5,127,230 | A | 7/1992 | Neeser et al. |
| 5,176,008 | A | 1/1993 | Van Steenburgh, Jr. |
| 5,187,953 | A | 2/1993 | Mount |
| 5,245,840 | A | 9/1993 | Van Steenburgh, Jr. |
| 5,297,392 | A | 3/1994 | Takata et al. |
| 5,325,894 | A | 7/1994 | Kooy et al. |
| 5,353,603 | A | 10/1994 | Outlaw et al. |
| 5,360,139 | A | 11/1994 | Goode |
| 5,471,848 | A | 12/1995 | Major et al. |
| 5,513,961 | A | 5/1996 | Engdahl et al. |
| 5,690,743 | A | 11/1997 | Murakami et al. |
| 5,762,119 | A | 6/1998 | Platz et al. |
| 5,974,812 | A | 11/1999 | Kátai et al. |
| 6,044,647 | A | 4/2000 | Drube et al. |
| 6,076,360 | A | 6/2000 | Viegas et al. |
| 6,230,518 | B1 | 5/2001 | Hahn et al. |
| 6,314,749 | B1 | 11/2001 | Van Steenburgh, Jr. |
| 6,354,088 | B1 | 3/2002 | Emmer et al. |
| 6,381,972 | B1 | 5/2002 | Cotter |
| 6,474,101 | B1 | 11/2002 | Quine et al. |
| 6,564,578 | B1 | 5/2003 | Fischer-Calderon |
| 6,964,168 | B1 | 11/2005 | Pierson et al. |
| 7,377,126 | B2 | 5/2008 | Gorbounov et al. |
| 7,497,180 | B2 | 3/2009 | Karlsson et al. |
| 7,891,197 | B2 | 2/2011 | Winter |
| 7,987,685 | B2 | 8/2011 | Oshitani et al. |
| 9,267,645 | B2 | 2/2016 | Mackey |
| 9,791,221 | B1 | 10/2017 | Litch |
| 10,612,821 | B1 | 4/2020 | Fernando |
| 11,112,155 | B1 | 9/2020 | Vaisman et al. |
| 11,168,925 | B1 | 11/2021 | Vaisman et al. |
| 2002/0148225 | A1 | 10/2002 | Lewis |
| 2002/0157407 | A1 | 10/2002 | Weng |
| 2004/0123624 | A1 | 7/2004 | Ohta et al. |
| 2005/0060970 | A1 | 3/2005 | Polderman |
| 2005/0201429 | A1 | 9/2005 | Rice et al. |
| 2006/0207285 | A1 | 9/2006 | Oshitani et al. |
| 2006/0218964 | A1 | 10/2006 | Saito et al. |
| 2007/0007879 | A1 | 1/2007 | Bergman, Jr. et al. |
| 2008/0092559 | A1 | 4/2008 | Williams et al. |
| 2008/0138195 | A1* | 6/2008 | Kern ............... F02C 3/113 415/122.1 |
| 2008/0148754 | A1 | 6/2008 | Snytsar |
| 2009/0158727 | A1 | 6/2009 | Marsala |
| 2009/0211298 | A1 | 8/2009 | Saul |
| 2009/0219960 | A1 | 9/2009 | Uberna et al. |
| 2009/0228152 | A1 | 9/2009 | Anderson et al. |
| 2010/0098525 | A1 | 4/2010 | Guelich |
| 2010/0154395 | A1 | 6/2010 | Frick |
| 2011/0114284 | A1 | 5/2011 | Siegenthaler |
| 2012/0167601 | A1 | 7/2012 | Cogswell et al. |
| 2012/0204583 | A1 | 8/2012 | Liu |
| 2012/0312379 | A1 | 12/2012 | Gielda et al. |
| 2013/0000341 | A1 | 1/2013 | De Piero et al. |
| 2013/0025305 | A1 | 1/2013 | Higashiiue et al. |
| 2013/0104593 | A1 | 5/2013 | Occhipinti |
| 2013/0111934 | A1 | 5/2013 | Wang et al. |
| 2013/0118180 | A1* | 5/2013 | Bayer ............... F01N 3/08 60/775 |
| 2013/0125569 | A1 | 5/2013 | Verma et al. |
| 2013/0340622 | A1 | 12/2013 | Marty et al. |
| 2014/0075984 | A1 | 3/2014 | Sugawara et al. |
| 2014/0165633 | A1 | 6/2014 | De Piero et al. |
| 2014/0166238 | A1 | 6/2014 | Sandu |
| 2014/0260341 | A1 | 9/2014 | Vaisman et al. |
| 2014/0331699 | A1 | 11/2014 | Higashiiue |
| 2014/0345318 | A1 | 11/2014 | Nagano et al. |
| 2014/0366563 | A1 | 12/2014 | Vaisman et al. |
| 2015/0059379 | A1 | 3/2015 | Ootani et al. |
| 2015/0260435 | A1 | 9/2015 | Kawano et al. |
| 2015/0263477 | A1 | 9/2015 | Onaka |
| 2016/0010907 | A1 | 1/2016 | Ali |
| 2016/0114260 | A1 | 4/2016 | Frick |
| 2016/0201956 | A1 | 7/2016 | Tamura et al. |
| 2016/0216029 | A1 | 7/2016 | Ragot |
| 2016/0291137 | A1 | 10/2016 | Sakimura et al. |
| 2016/0333747 | A1 | 11/2016 | KanFman |
| 2017/0081982 | A1 | 3/2017 | Kollmeier et al. |
| 2017/0108263 | A1 | 4/2017 | Cermak et al. |
| 2017/0167767 | A1 | 6/2017 | Shi et al. |
| 2017/0205120 | A1 | 7/2017 | Ali et al. |
| 2017/0299229 | A1 | 10/2017 | Carter et al. |
| 2018/0023805 | A1 | 1/2018 | Qin et al. |
| 2018/0180307 | A1 | 6/2018 | Owejan et al. |
| 2018/0245740 | A1 | 8/2018 | Kaminsky et al. |
| 2018/0245835 | A1 | 8/2018 | Kamei et al. |
| 2018/0328638 | A1 | 11/2018 | Mahmoud et al. |
| 2019/0052206 | A1* | 2/2019 | Noderer ............... H02P 9/008 |
| 2019/0111764 | A1 | 4/2019 | Oshitani et al. |
| 2019/0170425 | A1 | 6/2019 | Takami et al. |
| 2019/0203988 | A1 | 7/2019 | Kobayashi et al. |
| 2019/0248450 | A1 | 8/2019 | Lee et al. |
| 2019/0293302 | A1 | 9/2019 | Van et al. |
| 2019/0393525 | A1 | 12/2019 | Diethelm et al. |
| 2020/0158386 | A1 | 5/2020 | Wu et al. |
| 2020/0239109 | A1 | 7/2020 | Lee et al. |
| 2020/0363101 | A1 | 11/2020 | Jansen |

OTHER PUBLICATIONS

U.S. Appl. No. 16/448,271 filed Jun. 21, 2019, Vaisman et al.
U.S. Appl. No. 16/448,283, filed Jun. 21, 2019, Vaisman et al.
U.S. Appl. No. 16/448,332, filed Jun. 21, 2019, Vaisman et al.
U.S. Appl. No. 16/448,388, filed Jun. 21, 2019, Vaisman et al.
U.S. Appl. No. 16/666,851, filed Oct. 29, 2019, Davis et al.
U.S. Appl. No. 16/666,859, filed Oct. 29, 2019, Davis et al.
U.S. Appl. No. 16/666,865, filed Oct. 29, 2019, Davis et al.
U.S. Appl. No. 16/666,881, filed Oct. 29, 2019, Davis et al.
U.S. Appl. No. 16/666,899, filed Oct. 29, 2019, Davis et al.
U.S. Appl. No. 16/666,940, filed Oct. 29, 2019, Vaisman et al.
U.S. Appl. No. 16/666,950, filed Oct. 29, 2019, Vaisman et al.
U.S. Appl. No. 16/666,954, filed Oct. 29, 2019, Vaisman et al.
U.S. Appl. No. 16/666,959, filed Oct. 29, 2019, Vaisman et al.
U.S. Appl. No. 16/666,962, filed Oct. 29, 2019, Vaisman et al.
U.S. Appl. No. 16/666,966, filed Oct. 29, 2019, Vaisman et al.
U.S. Appl. No. 16/666,973, filed Oct. 29, 2019, Vaisman et al.
U.S. Appl. No. 16/666,977, filed Oct. 29, 2019, Vaisman et al.
U.S. Appl. No. 16/666,986, filed Oct. 29, 2019, Vaisman et al.
U.S. Appl. No. 16/666,992, filed Oct. 29, 2019, Vaisman et al.
U.S. Appl. No. 16/666,995, filed Oct. 29, 2019, Vaisman et al.
U.S. Appl. No. 16/807,340, filed Mar. 3, 2020, Vaisman.
U.S. Appl. No. 16/807,353, filed Mar. 3, 2020, Vaisman.
U.S. Appl. No. 16/807,411, filed Mar. 3, 2020, Vaisman.
U.S. Appl. No. 16/807,413, filed Mar. 3, 2020, Vaisman.
U.S. Appl. No. 16/807,582, filed Mar. 3, 2020, Vaisman.
U.S. Appl. No. 16/872,584, filed May 12, 2020, Vaisman et al.
U.S. Appl. No. 16/872,590, filed May 12, 2020, Vaisman et al.
U.S. Appl. No. 16/872,592, filed May 12, 2020, Vaisman et al.
"Quest for Performance: The Evolution of Modern Aircraft," Part II: The Jet Age, Chapter 10: Technology of the Jet Airplane, Turbojet and Turbofan Systems, National Aeronautics and Space Administration (NASA), 1985-2004, p. 1-19.
[No Author Listed], "Thermostatic Expansion Valves" Theory of Operation, Application, and Selection, Bulletin 10-9, Sporlan, Mar. 2011, 19 pages.
ammonia21.com [online], "R717 vs r404a do the advantages outweigh the disadvantages," Nov. 30, 2012, retrieved from <http://www.annnnonia21.conn/articles/3717/>, 13 pages.

(56) References Cited

OTHER PUBLICATIONS

Elstroem, "Capacitive Sensors Measuring the Vapor Quality, Phase of the refrigerant and Ice thickness for Optimized evaporator performance," Proceedings of the 13th IIR Gustav Lorentzen Conference on Natural Refrigerants (GL:2018), Valencia, Spain, Jun. 18-20, 2018, 10 pages.

Elstroem, "New Refrigerant Quality Measurement and Demand Defrost Methods," 2017 IIAR Natural Refrigeration Conference & Heavy Equipment Expo, San Antonio, TX, Technical Paper #1, 38 pages.

en.wikipedia.org [online] "Inert gas—Wikipedia" retrieved on Oct. 1, 2021, retrieved from URL <https://en.wikipedia.org/w/index.php?title=Inert_gas&oldid=1047231716>, 4 pages.

en.wikipedia.org [online] "Pressure regulator—Wikipedia," retrieved on Oct. 7, 2021, retrieved from URL < https://en.wikipedia.org/wiki/Pressure_regulator>, 8 pages.

en.wikipedia.org [online], "Isenthalpic process—Wikipedia, the free encyclopedia," available on or before Mar. 29, 2015, via Internet Archive: Wayback Machine URL <https://web.archive.org/web/20150329105343/https://en.wikipedia.org/wiki/Isenthalpicprocess>, retrieved on Jan. 12, 2021, retrieved from URL <https://en.wikipedia.org/wiki/Isenthalpicprocess>, 2 pages.

en.wikipedia.org [online], "Thermal expansion valve—Wikipedia", Dec. 23, 2020, retrieved on Jan. 8, 2021, retrieved from URL <https://en.wikipedia.org/wiki/Thernnal expansion valve>, 4 pages.

en.wikipedia.org [online], "Thermal expansion valve—Wikipedia," available on or before Feb. 14, 2015, via Internet Archive: Wayback Machine URL <https://web.archive.org/web/20150214054154/https://en.wikipedia.org.wiki/Thermal_expansion_valve>, retrieved on Jan. 12, 2021, URL <https://en.wikipedia.org.wiki/Thermal_expansion_valve>, 3 pages.

engineersedge.com [online], "Throttling Process Thermodynamic," Apr. 16, 2015, via Internet Archive: Wayback Machine URL <https://web.archive.org/web/20150416181050/https://www.engineersedge.conn/thernnodynannics/throttling process.htm>, retrieved on Jan. 12, 2021, retrieved from URL <https://en.wikipedia.org/wiki/Isenthalpicprocess>, 1 pages.

International Search Report and Written Opinion in International Appln. No. PCT/US2020/056787, dated Jan. 27, 2021, 13 pages.

Ohio.edu [online], "20 Engineering Thermodynamics Israel Urieli", Sep. 9, 2009, retrieved from URL< https://www.ohio.edu/mechanical/thermo/Intro/Chapt.1_6/Chapter2a.html>, 1 page.

osha.gov, [online] "Storage and handling of anhydrous ammonia," Part No. 1910, Standard No. 1910.111, GPO Source: e-CFR, 2005, retrieved on Oct. 2, 2021, retrieved from URL <https://www.osha.gov/laws-regs/regulations/standardnumber/1910/1910.111>, 31 pages.

thermal-engineering.org [online] "What is Vapor Quality—Dryness Fraction—Definition," May 22, 2019, retrieved on Oct. 19, 2021, retrieved from URL <https://www.thermal-engineering.org/what-is-vapor-quality-dryness-fraction-definition/>, 6 pages.

Wojtan et al., "Investigation of flow boiling in horizontal tubes: Part I—A new diabatic two-phase flow pattern map. International journal of heat and mass transfer," Jul. 2005, 48(14):2955-69.

Wojtan et al., "Investigation of flow boiling in horizontal tubes: Part II—Development of a new heat transfer model for stratified-wavy, dryout and mist flow regimes," International journal of heat and mass transfer, Jul. 2005, 48(14):2970-85.

* cited by examiner

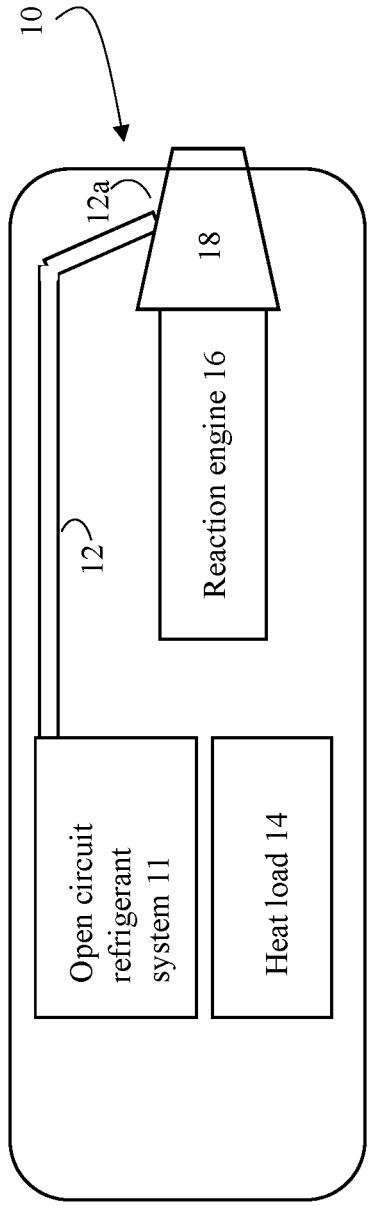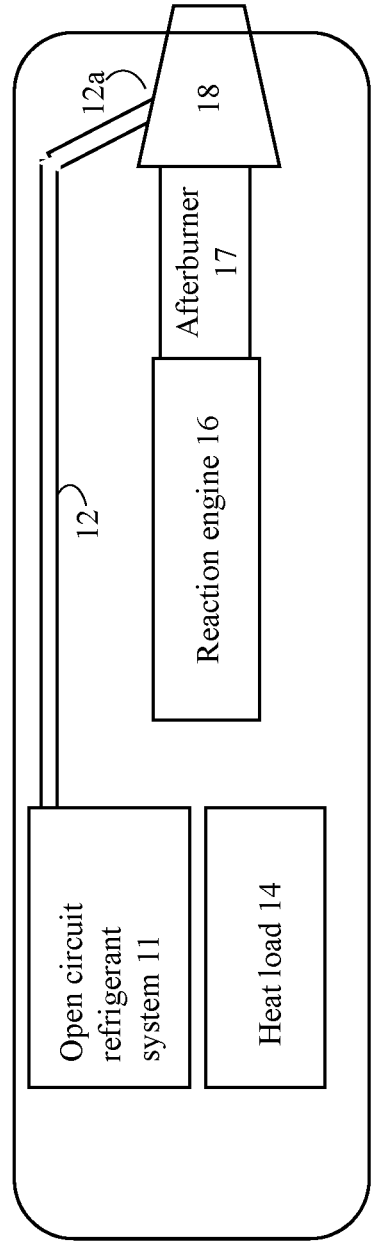

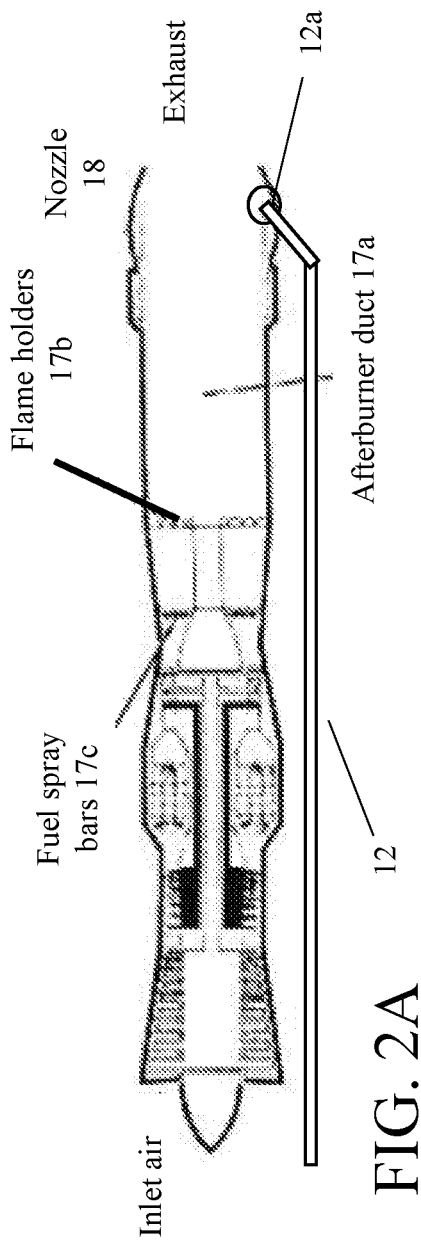
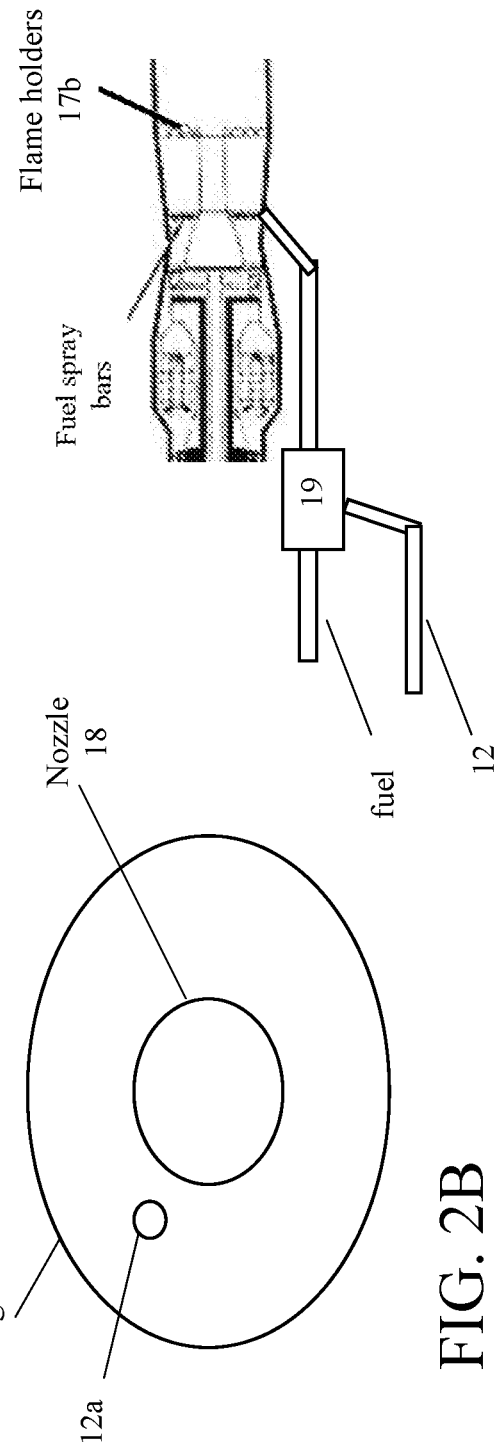
FIG. 2A
FIG. 2B
FIG. 2C

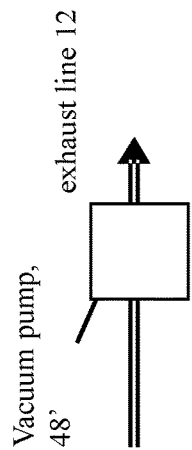
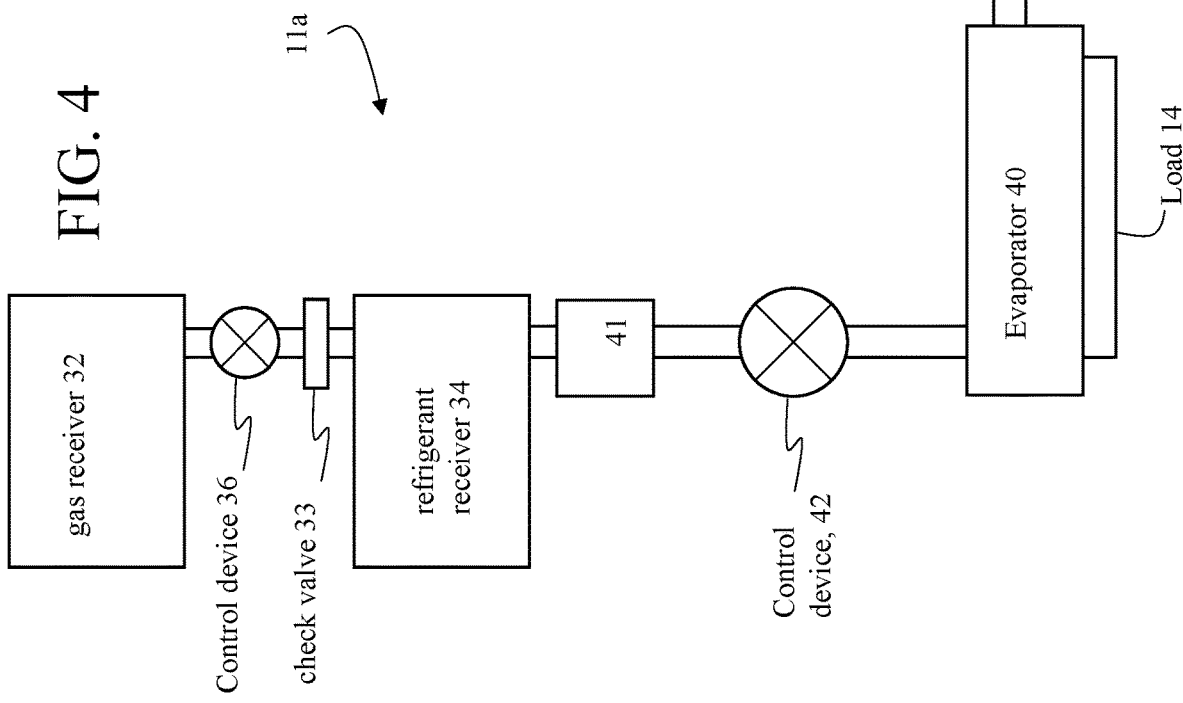
FIG. 4
FIG. 4A

PROCESSING VAPOR EXHAUSTED BY THERMAL MANAGEMENT SYSTEMS

BACKGROUND

Temperature sensitive loads such as electronic components and devices may require temperature regulation within a relatively narrow range of operating temperatures. Maintaining the temperature of such a load to within a small tolerance of a temperature set point can be challenging when a single-phase refrigerant fluid is used for heat extraction, since the refrigerant fluid itself will increase in temperature as heat is absorbed from the load.

Refrigeration systems absorb thermal energy from the heat sources operating at temperatures below the temperature of the surrounding environment, and discharge thermal energy into the surrounding environment. Conventional refrigeration systems, such as closed circuit systems can include at least a compressor, a heat rejection exchanger (i.e., a condenser), a liquid refrigerant receiver, an expansion device, and a heat absorption exchanger (i.e., an evaporator). Such closed-circuit refrigeration systems may pump significant amounts of absorbed thermal energy from heat sources into the surrounding environment.

Condensers and compressors can be heavy and can consume relatively large amounts of power. In general, the larger the amount of absorbed thermal energy that the system is designed to handle, the heavier the refrigeration system and the larger the amount of power consumed during operation, even when cooling of a heat source occurs over relatively short time periods.

SUMMARY

One approach for providing cooling of such electronic components where weight and or power consumption are of critical consideration is the use of an open circuit refrigeration system.

In particular, directed energy systems that are carried by airborne platforms such as jet airplanes, helicopters, drones, etc., may present many of the foregoing operating challenges, as such systems may include high heat flux, temperature sensitive components that require precise cooling over a relatively short time of operation, for which such open circuit refrigeration systems could be very useful, as these platforms may require configurations where weight and or power consumption are critical considerations.

Yet, the use of open circuit refrigeration systems presents other challenges, because such open circuit refrigeration systems require exhaust of refrigerant vapor.

While for terrestrial mobile platforms such as tanks and other mechanized vehicles the exhaust problem can be handled in various ways, with airborne platforms such as drones, and especially jet airplanes, handling exhaust from the open circuit system presents some practical problems. Burning the exhaust in engines that provide propulsion for such airborne platforms most likely will require modifications to such engines. That requirement is highly undesirable in flight-certified jet engines. In addition, in some platforms such as helicopters, there will be significant levels of air turbulence such that discharging refrigerant into the air could recirculate back into the cockpit and affect the health of pilots.

This disclosure features novel ways to handle exhaust in thermal management systems that include open circuit refrigeration systems (OCRSs). Burning discharged refrigerant vapor in the jet engines' exhaust stream(s) (whether entirely out of the engine or in an afterburner) will destroy the refrigerant vapor, and otherwise entrain and remove any remnants a safe distance from the vehicle.

According to an aspect, a vehicle includes an engine that translates an energy mass into an exhaust and a translated energy to power the vehicle, an exhaust outlet coupled to the engine, with the exhaust outlet receiving the exhaust from operation of the engine, and a thermal management system, including a thermal load, and an open circuit refrigeration system including an exhaust line, the open circuit refrigeration system configured to remove heat from the thermal load transferring heat to refrigerant in the open circuit system to transform the refrigerant into a refrigerant vapor, and which open circuit refrigeration system exhausts the refrigerant vapor from the exhaust line into the exhaust outlet coupled to the engine to incinerate the refrigerant vapor with the engine exhaust resulting from operation of the engine.

The above aspect may include amongst features described herein one or more of the following features.

The engine is a jet engine. The engine is a reaction engine and the vehicle is an airborne vehicle. The reaction engine is a jet engine. The vehicle is a jet plane, turboprop plane, or turbofan plane. The vehicle is a terrestrial vehicle. The vehicle is a terrestrial vehicle is a submersible vehicle. The vehicle is a stationary machine. The engine is a rocket engine and the vehicle is a space based vehicle. The vehicle carries a directed energy system, that is a high-energy laser comprised of a bank of one or more laser diodes.

According to an additional aspect, an airborne vehicle includes a reaction engine that produces a jet stream of discharged reaction mass to provide thrust for the airborne vehicle, an exhaust nozzle coupled to an jet stream exit of the reaction engine, and a thermal management system, including a thermal load, an open circuit refrigeration system including an exhaust line, the open circuit refrigeration system configured to remove heat from the thermal load and transfer the removed heat to a refrigerant in the open circuit system and transforms the refrigerant into a refrigerant vapor, and which open circuit refrigeration system exhausts the refrigerant vapor into an exhaust line, and an exhaust port coupled to the airborne vehicle and to the exhaust line, which exhaust port receives the refrigerant vapor and is configured to discharge the received refrigerant vapor into the jet stream from operation of the reaction engine.

The above aspect may include amongst features described herein one or more of the following features.

The reaction engine is a jet engine and the airborne vehicle further includes an exhaust nozzle, with the exhaust line of the open circuit refrigeration system coupled to the exhaust nozzle. The reaction engine is a jet engine and the airborne vehicle further includes an exhaust nozzle, with the exhaust line of the open circuit refrigeration system coupled to the airborne vehicle at a location that is in proximity to but not connected to the exhaust nozzle. The airborne vehicle further includes an afterburner coupled to the reaction engine, the afterburner including a fuel spray mechanism that delivers reaction engine fuel to the afterburner. The exhaust port is coupled to the airborne vehicle at a location that is in proximity to but not connected to the afterburner. The exhaust port is coupled to the fuel spray mechanism in the afterburner. The reaction engine includes a turbine, which provides thrust for the airborne vehicle, and the exhaust nozzle is coupled to the reaction engine after the turbine. The refrigerant fluid includes ammonia. The airborne vehicle carries a directed energy system, that is a high-energy laser comprised of a bank of one or more laser diodes.

According to an additional aspect, a method includes operating an engine to translate an energy mass into an exhaust and translated energy to power a vehicle, discharging at an exhaust outlet coupled to the engine an exhaust stream from operation of the engine, operating a thermal load that produces heat, removing the heat from the thermal load by transferring the heat to refrigerant in an open circuit refrigeration system that transforms the refrigerant into a refrigerant vapor, and which open circuit refrigeration system exhausts the refrigerant vapor from an exhaust line into the exhaust stream from the engine to incinerate the refrigerant vapor by exhaust stream that results from operation of the engine.

The above aspect may include amongst features described herein one or more of the following features.

The engine is a jet engine. The engine is a reaction engine and the vehicle is an airborne vehicle. The reaction engine is a jet engine. The vehicle is a jet plane, turboprop plane, or turbofan plane. The vehicle is a terrestrial vehicle. The vehicle is a terrestrial vehicle is a submersible vehicle. The vehicle is a stationary machine. The engine is a rocket engine. The vehicle is a space based vehicle.

According to an additional aspect, a method includes producing by a reaction engine a jet stream of discharged reaction mass to provide thrust for the airborne vehicle that has an exhaust nozzle coupled to an jet stream exit of the reaction engine, discharging the jet stream at the exhaust nozzle, operating a thermal load that produces heat, removing the heat from the thermal load by transferring the heat to refrigerant in an open circuit refrigeration system that transforms the refrigerant into a refrigerant vapor, and which open circuit refrigeration system exhausts the refrigerant vapor from an exhaust line into the jet stream from the engine to incinerate the refrigerant vapor by the jet stream that results from operation of the reaction engine.

The above aspect may include amongst features described herein one or more of the following features.

The reaction engine is a jet engine and the method further includes discharging the jet stream at an exhaust port that is distal from the exhaust nozzle, with the exhaust line of the open circuit refrigeration system coupled to the exhaust port. The reaction engine is a jet engine and the method further includes discharging the jet stream at an exhaust port that is in proximity to but not connected to the exhaust nozzle. The reaction engine is a jet engine and the method further includes discharging the jet stream at an exhaust port that is in proximity to but not connected to an afterburner coupled to the reaction engine, the afterburner including a fuel spray mechanism that delivers reaction engine fuel to the afterburner.

The reaction engine is a jet engine and the method further includes discharging the jet stream at an exhaust port that is in proximity to and connected to a fuel spray mechanism that delivers reaction engine fuel to an afterburner coupled to the reaction engine. The reaction engine is a jet engine and the method further includes discharging the jet stream at an exhaust port that is in proximity to but not connected to the afterburner. The reaction engine is a jet engine and includes a turbine, and the method further includes discharging the jet stream at an exhaust port that is located downstream of the turbine. The refrigerant fluid includes ammonia.

One or more of the above aspects may include one or more of the following advantages/operational features.

Rather than discharged refrigerant vapor being discharged directly into an ambient environment or discharged through a jet engine, by being incinerated in a combustion unit of the jet engine, the discharged refrigerant vapor is introduced into the jet engines' exhaust stream(s) (whether entirely out of the engine or in an afterburner). Introducing discharged refrigerant entirely out of the engine or introducing after or e.g., into an afterburner will destroy the discharged refrigerant vapor and/or entrain any remnants of the discharged refrigerant vapor to a safe distance away from the airborne platform.

The details of one or more embodiments are set forth in the accompanying drawings and the description below. Other features and advantages will be apparent from the description, drawings, and claims.

DESCRIPTION OF DRAWINGS

FIGS. 1A and 1B are schematic diagrams of example of airborne platforms carrying thermal sensitive electronic equipment that are cooled by a thermal management system that includes an open circuit refrigeration system.

FIGS. 2A-2C and 3A-3B are schematic diagrams of exemplary types of reaction engines, e.g., a turbojet and a turbofan, respectively showing alternative connections of exhaust lines.

FIGS. 4-6 are schematic diagrams showing exemplary types of open circuit refrigeration systems.

FIG. 4A shows an alternative arrangement to that of FIG. 4, which includes a vacuum pump or compressor.

DETAILED DESCRIPTION

I. General Introduction

Figure 3A:
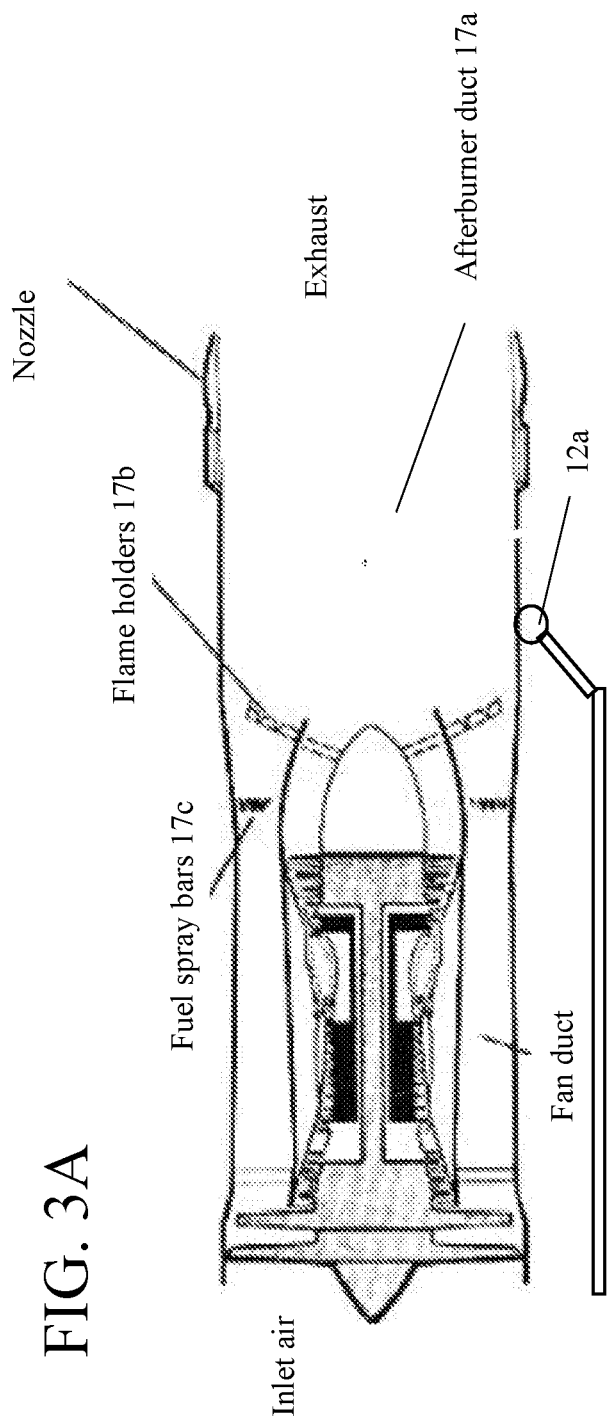

Cooling of high heat flux loads that are also highly temperature sensitive can present a number of challenges. Such loads generate significant quantities of heat that are extracted during cooling. In conventional closed-cycle refrigeration systems, cooling high heat flux loads typically involves circulating refrigerant fluid at a relatively high mass flow rate. Closed-cycle system components include compressors and condensers that are typically heavy and consume significant power.

In addition, temperature sensitive loads such as electronic components and devices may require temperature regulation within a relatively narrow range of operating temperatures. Maintaining the temperature of such a load, to within a small tolerance of a temperature set point, can be challenging when a single-phase refrigerant fluid is used for heat extraction, since the refrigerant fluid itself will increase in temperature as heat is absorbed from the load.

One proposed solution to these problems especially for use with directed energy systems that are mounted to mobile vehicles such as trucks or airborne vehicles is the use of open circuit refrigeration systems. On mobile vehicles such as trucks or airborne vehicles disposal of discharged refrigerant can occur in several ways. For example, the thermal management system could further process spent discharged refrigerant vapor by a chemical scrubber or water-based scrubber, or where the refrigerant fluid vapor is highly chemically reactive, the refrigerant fluid vapor can be exposed to one or more chemical agents that oxidize, reduce, or otherwise react with the refrigerant fluid vapor to yield a less reactive product use an adsorptive sink for the refrigerant fluid. Where the refrigerant fluid is flammable, refrigerant processing can be implemented with incineration. Combustion products can be discharged from the incinerator or collected (e.g., via an adsorbent material bed) for later disposal or an incinerator can be implemented as a combustor of an engine or another mechanical power-generating device. Refrigerant fluid vapor can be mixed with oxygen, for example, and combusted in a piston-based engine or turbine to perform mechanical work, such as providing drive power for a vehicle or driving a generator to produce electricity. For airborne applications, these solutions may not be feasible.

While one solution to the problem of discharging refrigerant vapor for airborne applications may be to incinerate such vapor inside of the jet engine, that may be infeasible for many instances and otherwise be problematic from both safety and cost considerations.

Disclosed below are configurations of thermal management systems with open circuit refrigeration systems that avoid attendant issues regarding exhaust of refrigerant vapor for airborne applications.

Irrespective of the specific issues presented by airborne platforms (jets, helicopters, etc.), the techniques disclosed below may also be applicable to other vehicles/applications including space vehicles and terrestrial vehicles (trucks, tanks, etc.) and also stationary applications if there were, for example, machines that were not self-propelled, but were designed for an application where weight (e.g., of a compressor/condensers) or power (e.g., to power the compressor) or other characteristics of a closed circuit refrigerant system were problematic. The techniques below will be discussed in conjunction with airborne applications or platforms.

II. Refrigerant Exhaust from OCRS in Airborne Platforms

Referring to FIG. 1A, an airborne platform 10 is shown. The airborne platform 10 typically will include many conventional components/systems that are not disclosed/illustrated herein. However, the airborne platform 10 does include a heat load 14 and an open circuit refrigerant system 11 that is used to cool the heat load 14 during operation of the heat load 14. Examples 11a-11c of an open circuit refrigerant system (OCRS) 11 are disclosed in FIGS. 4-5, below. The open circuit refrigerant system 11 includes an exhaust line 12 (or conduit) that discharges refrigerant vapor subsequent to refrigerant (liquid or liquid/vapor) passing through the open circuit refrigerant system 11, absorbing heat from the heat load 14 and converting a portion or all of the refrigerant (liquid or liquid/vapor) into refrigerant vapor that is discharged via the exhaust line 12.

In the embodiment shown in FIG. 1A, the exhaust line 12 is connected to or is coupled to a refrigerant vapor exhaust port 12a located after a reaction engine 16. The reaction engine 16 can be any type of reaction engine. A reaction engine as used herein is an engine or motor that produces thrust by expelling a reaction mass. Examples of reaction engines include jet engines, such as turbojets, turbofans, ramjets, etc., as well as other types of engines that expel a reaction mass to produce thrust. A reaction engine typically has at least one combustor, a turbine, and an exhaust nozzle that provide thrust for the airborne vehicle.

Thus, as disclosed herein the open circuit refrigeration system 11 has the exhaust line 12 discharging (or exhausting) refrigerant vapor during operation of the open circuit refrigeration system 11. The exhaust line 12 of the open circuit refrigeration system is connected to, or coupled to, the refrigerant vapor exhaust port 12a. In some implementations, the refrigerant vapor exhaust port 12a is either upstream of or downstream from an exhaust nozzle 18. In some implementations, the refrigerant vapor exhaust port 12a is either upstream of or downstream from an afterburner. In some implementations, the refrigerant vapor exhaust port 12a is either upstream of or downstream from an IR (infrared) suppressor.

Thus, the refrigerant vapor exhaust port 12a is coupled to a portion of the airborne vehicle that is at a location in proximity to the exhaust nozzle 18 and posterior to the combustion portion of the reaction engine 16, e.g., after a combustor and typically after a turbine portion of the reaction engine 16. By "in proximity to the exhaust nozzle 18" is meant that under operation of the OCRS 11, the discharged refrigerant vapor discharged at refrigerant vapor exhaust port 12a will be directed into the reactive mass exhaust from the reaction engine 16 to be substantially incinerated and entrained away from the airborne vehicle 10. OCRS 11 is further characterized by the feature that discharged refrigerant vapor discharged from the exhaust line 12 via port 12a is not returned to the refrigerant receiver 34.

FIGS. 2 and 3 were adapted from "Quest for Performance: The Evolution of Modern Aircraft," Part II: THE JET AGE Chapter 10: Technology of the Jet Airplane (1985 updated 2004) and found at https://www.hq.nasa.gov/pao/History/SP-468/ch10-3.htm, which show a turbojet with an afterburner and a turbofan with an afterburner, respectively, as examples of a reaction engine.

In FIGS. 2 and 3 are shown possible locations for the port 12a. The exhaust line 12 would run through the airborne platform fuselage (not shown) or also within the wing (FIG. 2A-1) depending on placement of the reaction engines. Both FIGS. 2 and 3 were modified to show the added exhaust line 12 from an open circuit refrigeration system 11, and how the exhaust line 12 could be coupled to the refrigerant vapor exhaust port 12a that is provided into the nozzle 18.

In other implementations the refrigerant vapor exhaust port 12a is provided proximate to, but spaced from, i.e., not in the nozzle 18, as shown in FIG. 2B. Thus, FIG. 2B shows the rear portion of an jet with a fuselage portion of the jet having the nozzle 18 and with the refrigerant vapor exhaust port 12a adjacent to but not in the nozzle 18.

In other implementations, such as in FIG. 2C, the refrigerant vapor exhaust port 12a is provided by or attached to fuel spay bars 17c upstream from flame holders 17b of afterburner 17 that has an afterburner duct 17a through which exhaust, afterburner exhaust from the flame holders, and discharged refrigerant vapor pass in those airborne platforms that include an afterburner 17 after the reaction engine 16. An afterburner 17 is a component typically used for additional thrust. The afterburner 17 includes ports that are used to receive additional reaction fuel mass (e.g., jet fuel) that is injected via the fuel spay bars 17c into a jet stream downstream of the turbine portion of the reaction engine 16. Thus, in some embodiments, the refrigerant vapor exhaust port 12a can be one or more of the ports that receive the additional reaction fuel mass by mixing such fuel with discharged vapor in a mixing component 19, provided that the refrigerant vapor would not adversely interfere with the additional reaction fuel mass (e.g., jet fuel). Other variations are feasible, such as the variation of FIG. 2B-1 discussed below.

Figure 3B:
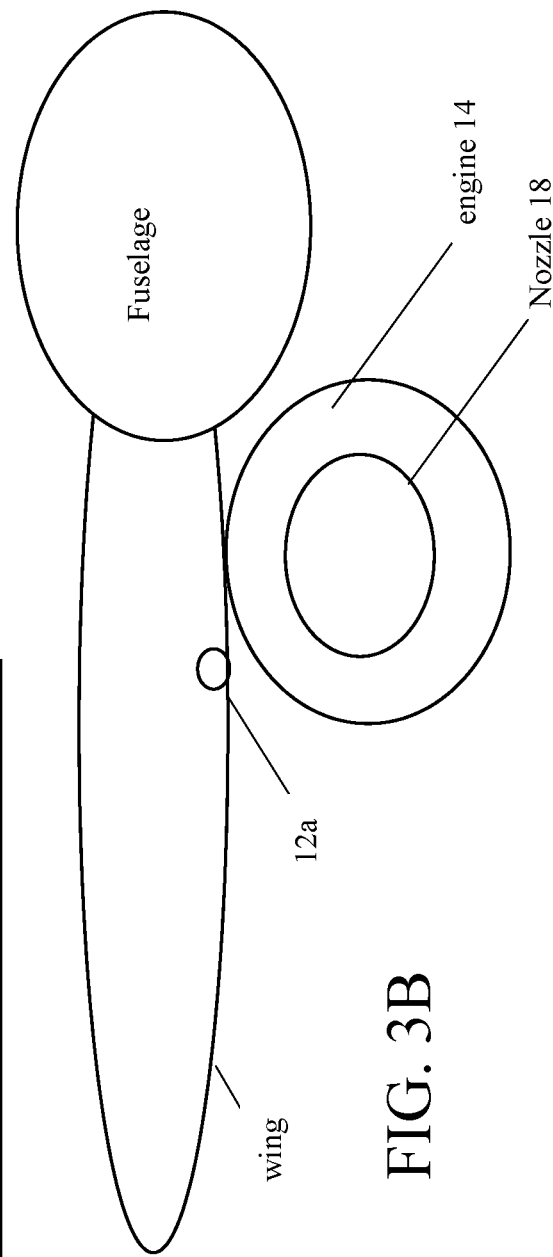

In another variation, FIG. 3B shows the rear portion of a jet with the fuselage portion of the jet attached to a wing. The engine 14 is mounted under or within, or otherwise attached to the wing. The refrigerant vapor exhaust port 12a is adjacent to, but not in the nozzle 18 portion of the engine 14. Other variations are feasible, such as the variation of FIGS. 2B and 2C.

In all of these implementations conduit or other fluid carrying lines are provided through the platform 10 such that refrigerant vapor can be transported from the refrigeration system 11 to the exhaust port 12a. In any of these implementations, the refrigerant vapor exhaust port 12a is configured such that discharged vapor from the open circuit refrigeration system 11 is directed into the discharged reaction mass that is expelled from the reaction engine 16. The discharged reaction mass from the jet engine will burn the discharged refrigerant vapor that is discharged from the open circuit refrigeration system. The jet engines' exhaust stream (s), whether entirely out of the engine or in an afterburner, will destroy the refrigerant vapor and otherwise entrain and remove any remnants to a safe distance from the airborne vehicle.

When the refrigerant vapor is ammonia, burning ammonia in an engine would likely require modifications to most if not all jet engines, and that is generally undesirable especially for in flight-certified jet engines. While the modifications disclosed herein, e.g., the addition of the port, are changes to existing aircraft and thus may prompt recertification by governing authorities of the flightworthiness of the changes of aircraft having these changes, such changes would most likely avoid the need for recertification of flightworthiness of the jet engine itself, and significant potential redesign of the engine.

Thus, in a reaction engine, e.g., a jet engine of a jet plane, the refrigerant, e.g., ammonia will be incinerated by, and entrained by, the discharged reaction mass from the jet engine. In a helicopter, the exhaust from the various engine types used such as turbine engines, turboshafts, etc., can be used to incinerate and also entrain the refrigerant discharged from the exhaust line 12. Thus in both instances, discharged reactive mass will burn the discharged refrigerant vapor and otherwise entrain and remove any remnants to a safe distance from the airborne platform 10.

III. Examples of Open Circuit Refrigeration Systems (OCRS)

Referring now to FIG. 4, an example of an open circuit refrigeration system (OCRS) 11a with an optional gas receiver 32 and a refrigerant receiver 34 is shown. OCRS 11a includes an optional valve 35, a first control device 36, an evaporator 40, a second control device 42, and conduits (not numbered). The thermal (heat) load 14 is coupled to an evaporator 46. The gas receiver 32 is optional but, as shown, is connected to refrigerant receiver 34 via conduit, such that a gas flow path extends between gas receiver 32 and refrigerant receiver 34. An optional third control device 48 is positioned along the gas flow path between gas receiver 32 and refrigerant receiver 34. (OCRS) 11a may also include optional check 33 and solenoid control valves 41.

When an ambient temperature is very low and, as a result, pressure in the receiver 34 is low and insufficient to drive refrigerant fluid flow through the system 11, gas from the gas receiver 32 can be directed into refrigerant receiver 34. The gas compresses liquid refrigerant fluid in refrigerant receiver 34, maintaining the liquid refrigerant fluid in a sub-cooled state, even when the ambient temperature and the temperature of the liquid refrigerant fluid are relatively high.

Upon initiation of a cooling operation, refrigerant fluid from refrigerant receiver 34 is discharged from an outlet and through optional valves if present. Refrigerant fluid is transported through a conduit to control device 36, which directly or indirectly controls vapor quality at the evaporator 40 outlet. Heat from the heat load 14 causes refrigerant in a liquid state that enters the evaporator to change phase to a vapor state which is subsequently discharged from the OCRS 11a via the exhaust line 12, and from the refrigerant vapor exhaust port 12a located downstream from the turbine in the reaction engine 16.

Referring to FIG. 4A an example of a thermal management system 10 that includes an open circuit refrigeration system with vacuum pump 48' is shown. This system 10 includes the feature of the system of FIG. 4, but has the vacuum pump 48' (or a compressor), used in place of the back-pressure regulator of FIG. 4. The compressor or vacuum can be a single, multi-speed, or a variable speed device that can be controlled by the controller that produces control signals (based on sensed thermodynamic properties) to control operation of the various ones of valves, as needed, as well as the compressor or vacuum pump 48'. As used herein "compressor or vacuum pump" generally refers to a compressor or a vacuum pump as alternative devices. A compressor is, in general, a device that increases the pressure of a gas by reducing the gas' volume. The compressor is similar to vacuum pumps as both increase the pressure on a fluid and both can transport the fluid through a pipe and also reduce the volume of the compressed gas or vapor. Usually compressor refer to devices operating at and above ambient pressure and vacuum pumps refer to devices operating below ambient pressure. In general either a "compressor" or a "vacuum pump" are alternative devices for use as the component 48'.

The compressor or vacuum pump 48' generally functions to control the fluid pressure upstream of the evaporator 40. In general, the compressor or vacuum pump 48' can be implemented using a variety of different pump/compressor technologies, and is selected based on the refrigerant fluid volume flow rate, the pressure differential across the compressor or vacuum pump 48', and the pressure and temperature at the compressor or vacuum pump inlet.

Figure 5:
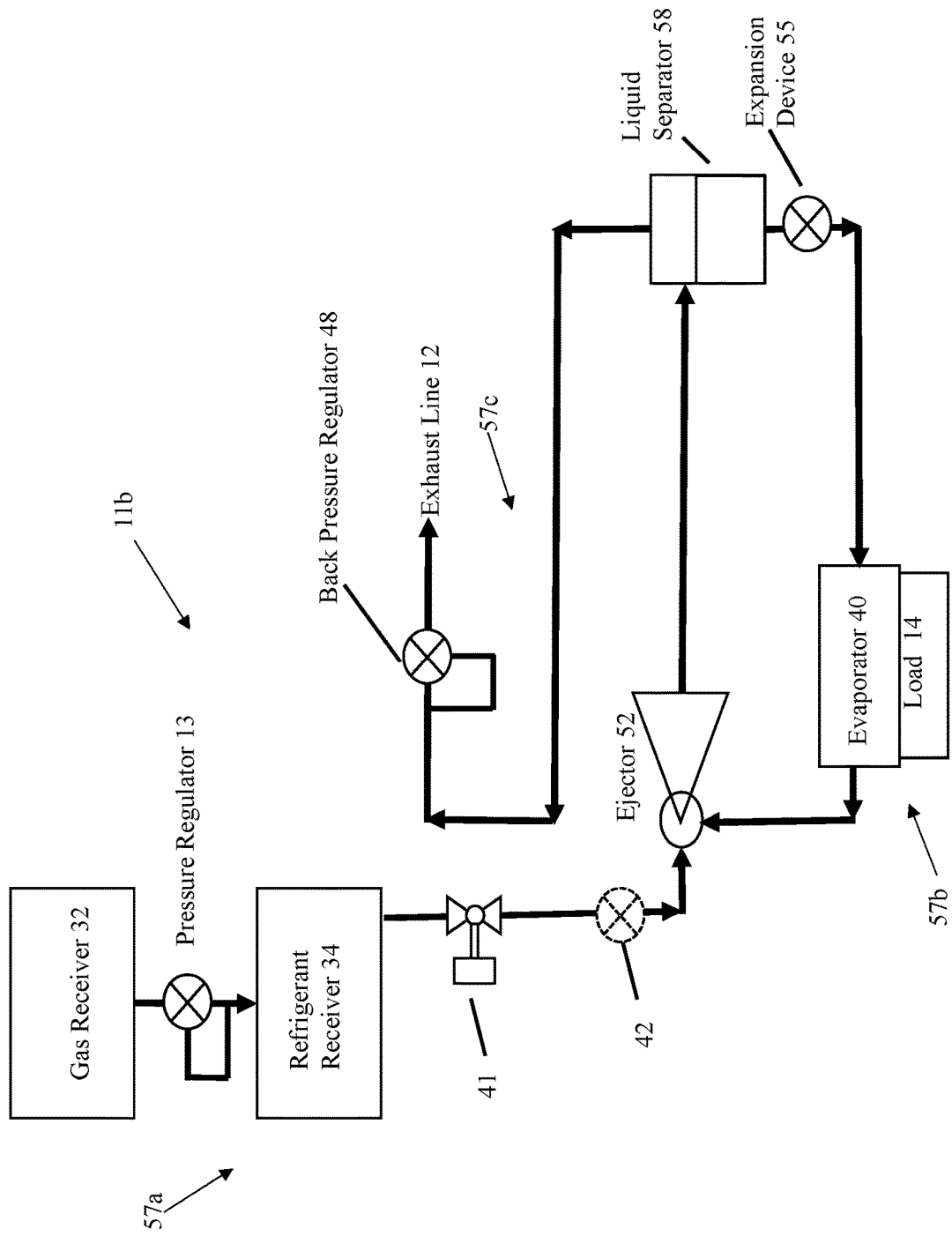

Referring now to FIG. 5, another example of open circuit refrigeration system is shown. This open circuit refrigeration system 11b includes an ejector 52. This system 11b also includes an optional first receiver 32 that receives and is configured to store a gas and an optional control device 36, e.g., an expansion valve. The system 11b further includes a refrigerant fluid flow path 15a. The refrigerant fluid flow path 15a includes an optional control device 41, e.g., an expansion valve, which is downstream from a second receiver 34 that receives and is configured to store sub-cooled liquid refrigerant. The gas pressure supplied by the gas receiver 32 compresses the liquid refrigerant in the receiver 34 and maintains the liquid refrigerant in a sub-cooled state (e.g., as a liquid existing at a temperature below its normal boiling point temperature) even at high ambient and liquid refrigerant temperatures. OCRSE 11b also may include optional valve 41 and an optional first control device 42, a second control device 55 and a back-pressure regulator (third control device) 48 coupled to exhaust line 12.

The ejector 52 has a primary inlet or high pressure inlet that is coupled to the second receiver 34. In OCRSE 11b, an outlet of the ejector 52 is coupled to an inlet of a liquid separator 58. The ejector 26 also has a secondary inlet or low-pressure inlet. The liquid separator 58 in addition to the inlet has a first outlet (vapor side outlet) and a second outlet 28c (liquid side outlet). The first outlet of the liquid separator 58 is coupled to an inlet (not referenced) of a back-pressure regulator 59 and the back-pressure regulator 59 has an outlet (not referenced) that feeds an exhaust line 12. The evaporator 40 is coupled to the secondary inlet of the ejector 52.

The OCRSE 11b can be viewed as including three circuits. A first circuit 57a being the refrigerant flow path 57a that includes the receivers 32 and 34 and two downstream circuits 57b and 57c that are downstream from the liquid separator 28. Downstream circuit 15b carries liquid from the liquid separator 58 and includes the expansion device 55 that feeds the evaporator 40. The downstream circuit 57c includes the back-pressure regulator 48, and the exhaust line 12, which discharges refrigerant vapor.

The use of an ejector and a liquid separator in the disclosed configuration effectively has the ejector acting as a "pump," to "pump" a secondary fluid flow, e.g., principally liquid from the liquid separator 58 using energy of a primary refrigerant flow from the refrigerant receiver 34. Recirculation of the refrigerant in the liquid phase, in effect, increases the amount of refrigerant in the receiver 34 when compared to approaches in which the liquid from the liquid/vapor phase of refrigerant is discharged from the evaporator.

Figure 6:
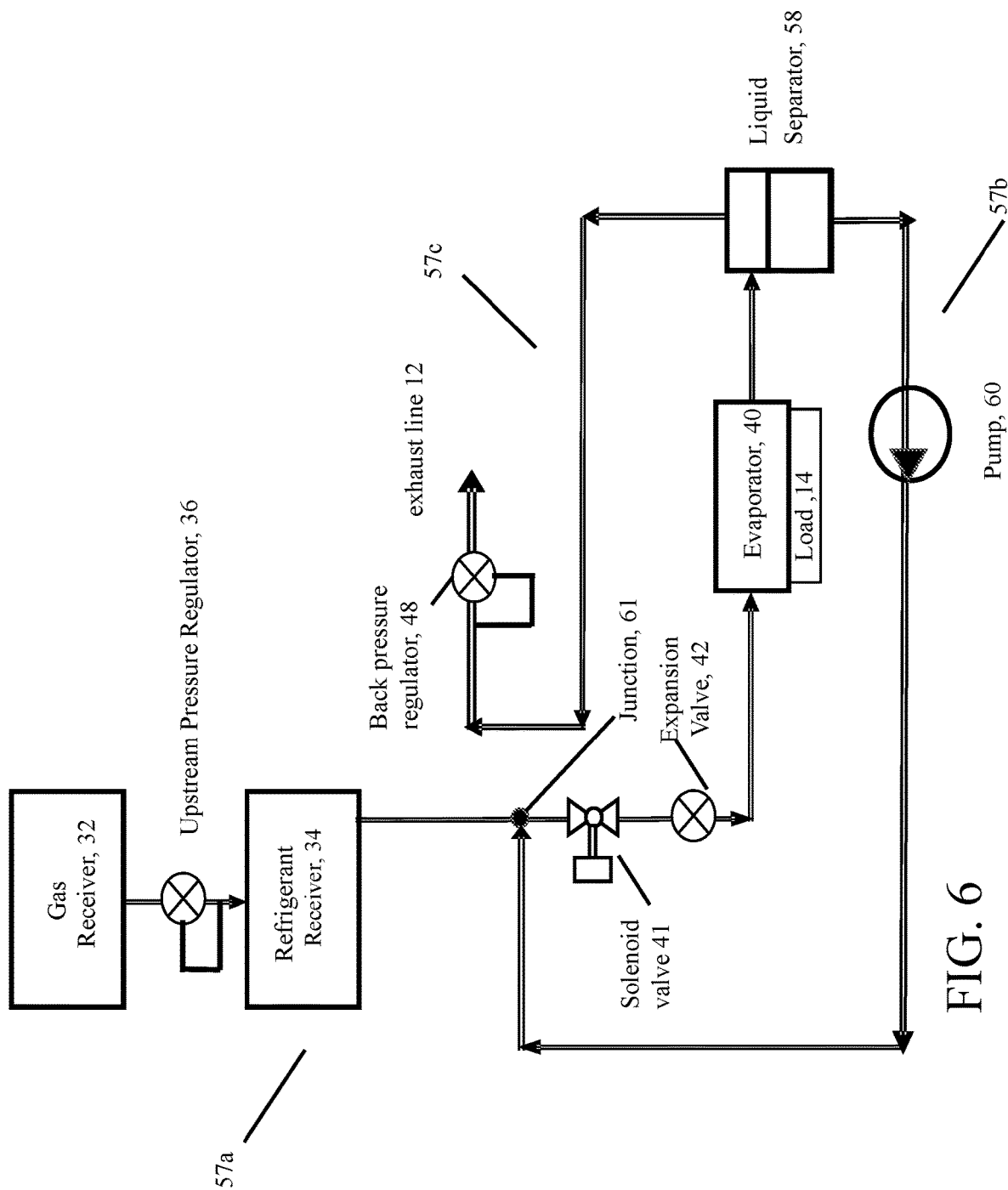

Referring now to FIG. 6, an open circuit refrigeration system with pump (OCRSP) system 11c is shown. This is one of several open circuit refrigeration system with pump configurations. OCRSP 11c includes an optional first receiver 32 that is configured to store a gas that is fed to a first control device 36. The first control device 36 regulates gas pressure from the first receiver 32 and, being upstream from a second receiver 34, feeds gas to the second receiver 34. The second receiver 34 is configured to store liquid refrigerant, i.e., subcooled liquid refrigerant. The second receiver 34 is configured to receive the gas from the first receiver 32 and stores the gas above the subcooled liquid refrigerant, ideally such that there is no or nominal mixing of the gas with the subcooled refrigerant. The gas pressure supplied by the gas receiver 32 compresses the liquid refrigerant in the receiver 34 and maintains the liquid refrigerant in a sub-cooled state even at high ambient and liquid refrigerant temperatures.

OCRSP 11c also includes a refrigerant fluid path including an optional first control device, e.g., a solenoid control valve 41, an optional second control device, e. g., an expansion valve 42 a junction device 61 that has first and second ports configured as inlets, and a third port configured as an outlet. A first one of the inlets of the junction device 61 is coupled to an outlet of the receiver 34 and the second one of the inlets of the junction device 61 is coupled to a pump 60. An inlet of the optional solenoid control valve 41 (if used) is coupled to the outlet of the junction device 61. Otherwise, the outlet of the junction device 61 is coupled to feed an input of the second control device, e. g, the expansion valve 42 (if used), or if neither solenoid control valve 41 nor the expansion valve 42 is used, the outlet of the junction device 61 is coupled to evaporator 40. The junction device can be coupled in any of a number of different configurations.

The evaporator 40 has an inlet coupled to an outlet of the expansion valve 42. The evaporator 40 also has an outlet coupled to an inlet of a liquid separator 58. The liquid separator 58, in addition to the inlet, has a first outlet (vapor side outlet) and a second outlet (liquid side outlet). The first outlet of the liquid separator 58 is coupled to an inlet of third control device 48, such as a back-pressure regulator that controls a vapor pressure in the evaporator 40. The back-pressure regulator 48 has an outlet (not referenced) that feeds exhaust line 12. The second outlet of the liquid separator 58 is coupled to an inlet of the pump 60. An output of the pump 60 is coupled to the second input of the junction device 61. In the liquid separator 58 only, or substantially only, liquid exits the liquid separator 58 at the liquid side outlet and only, or substantially only, vapor exits the separator 58 at the vapor side outlet.

The evaporator 40 is configured to be coupled to the thermal load 14. The OCRSP 11c can be viewed as including three circuits. A first circuit 57a being the refrigerant flow path that includes the receiver 34, and two circuits 57b and 57c that are downstream from the liquid separator 58. Downstream circuit 57b carries liquid from the liquid separator 58 via the pump 60, which liquid is pumped back into the evaporator 40 indirectly via the junction device 61 and the downstream circuit 57c that includes the back-pressure regulator 48, which discharges vapor via the exhaust line 12.

IV. Integration with Directed Energy Systems

The thermal management systems and methods disclosed herein can implemented as part of (or in conjunction with) directed energy systems such as high energy laser systems. Due to their nature, directed energy systems typically present a number of cooling challenges, including certain heat loads for which temperatures are maintained during operation within a relatively narrow range.

Figure 7:
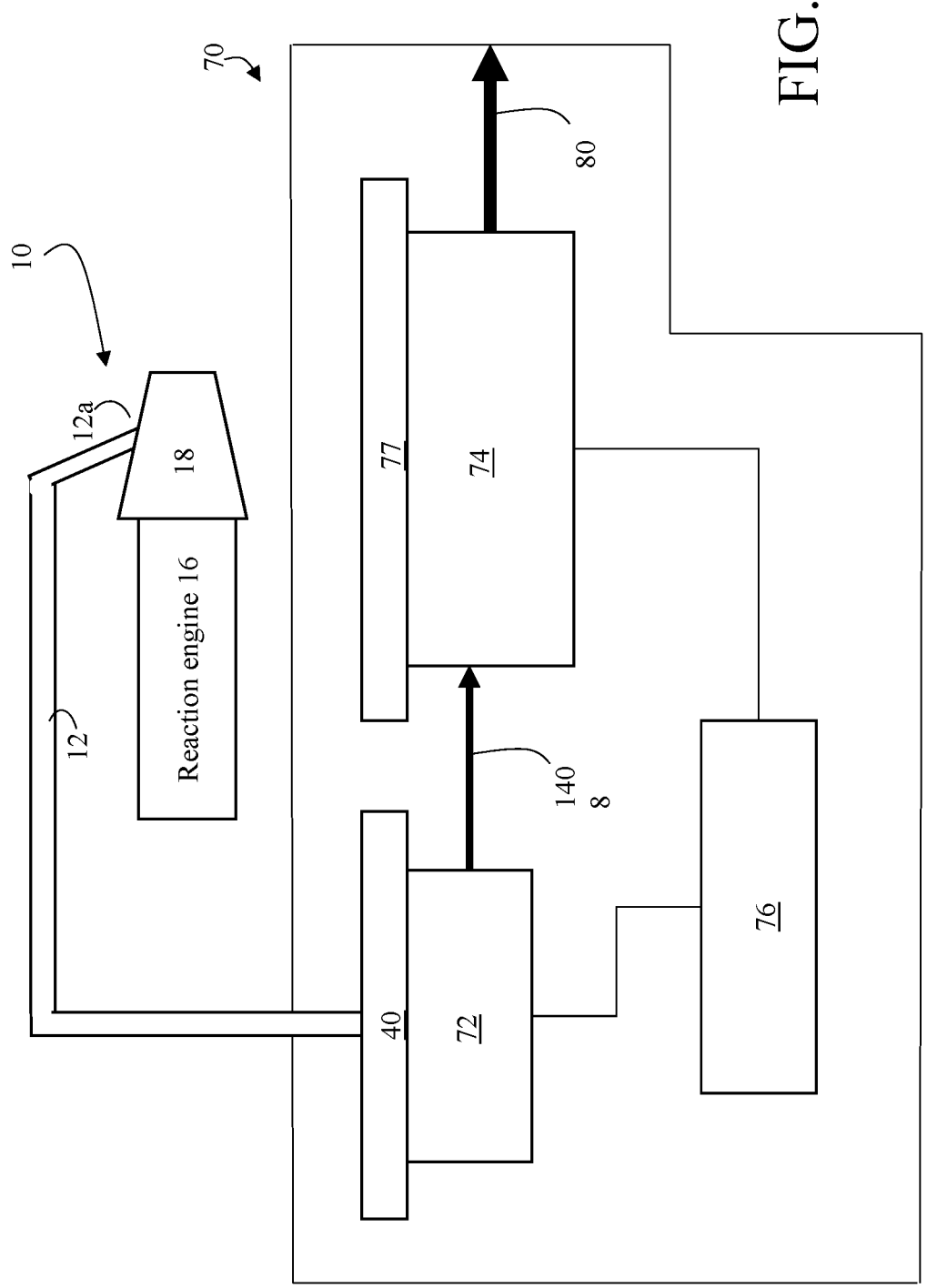
FIG. 7 is a schematic diagram of an exemplary directed energy system that includes a thermal management system and open circuit refrigeration system.

FIG. 7 shows one example of a directed energy system, specifically, a high-energy laser system 70. System 70 includes a bank of one or more laser diodes 72 and an amplifier 74 connected to a power source 76. During operation, laser diodes 72 generate an output radiation beam 78, which is amplified by amplifier 74 and directed as an output beam 80 onto a target (not shown). Generation of high-energy output beams can result in the production of significant quantities of heat. Certain laser diodes, however, are relatively temperature sensitive, and the operating temperature of such diodes is regulated within a relatively narrow range of temperatures to ensure efficient operation and avoid thermal damage. Amplifiers are also temperature-sensitive, although typically less sensitive than diodes. To regulate the temperatures of various components of directed energy systems such as diodes 72 and amplifier 74, such systems can include components and features of the thermal management systems disclosed herein.

In FIG. 7, evaporator 40 is coupled to diodes 72, while a heat exchanger 77 (which is disclosed as included in some of the embodiments of open circuit systems in the above incorporated by reference patent applications) is coupled to amplifier 74. (The other components of the thermal management systems disclosed herein are not shown for clarity, but would be apparent to those skilled in the art.) However, it should be understood that any of the features and components discussed above can optionally be included in directed energy systems. Diodes 72, due to their temperature-sensitive nature, effectively function as a heat load 14 in system 70, while amplifier 74 functions as another heat load (not referenced).

System 70 is one example of a directed energy system that can include various features and components of the thermal management systems and methods described herein. However, it should be appreciated that the thermal management systems and methods are general in nature, and can be applied to cool a variety of different heat loads under a wide range of operating conditions. Also shown in FIG. 7 is exhaust line 12 that is coupled to the refrigerant vapor exhaust port 12a at the nozzle 18 (or in a location adjacent to but after the turbine portion of the reaction engine 16).

In some implementations of thermal management systems there exists a necessity of cooling low heat loads that operate over long (or continuous) time intervals and high heat loads (e.g., directed energy systems) that operate over short time intervals of time relative to the heat load and operating interval of the low heat load. In such implementations, a hybrid approach can be used in which the low heat load is cooled by a closed circuit refrigeration system, whereas the heat load is cooled by the open circuit refrigeration systems discussed above.

Figure 8:
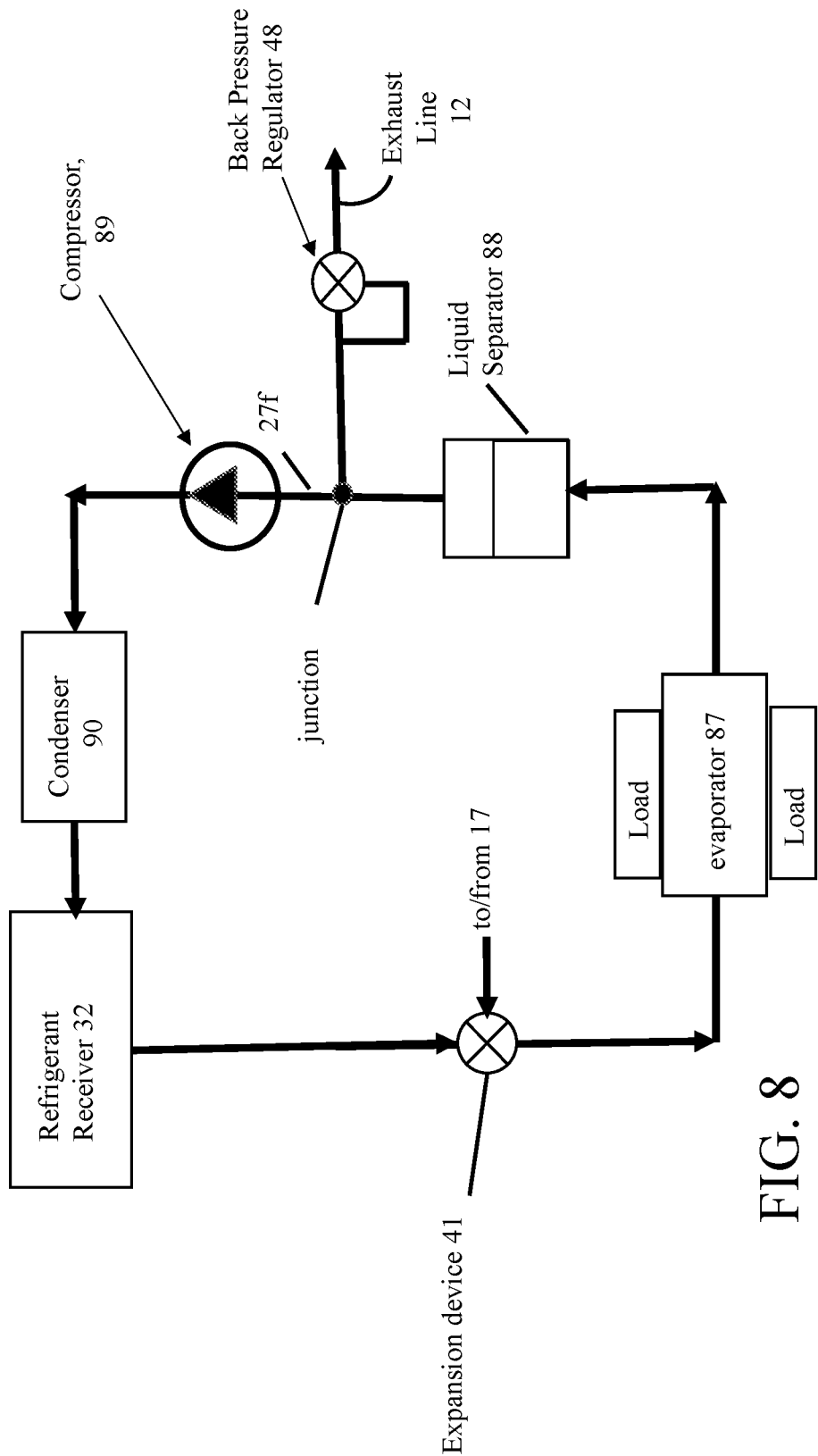
FIG. 8 is a schematic diagram of an integrated open and closed circuit refrigeration system.
Figure 8A:
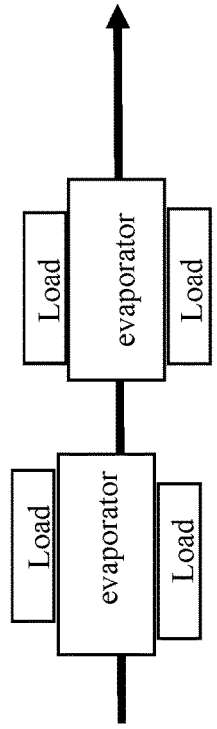
FIGS. 8A-8D are schematics of alterative evaporator arrangements.
Figure 8B:
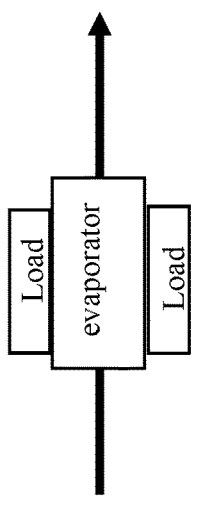
Figure 8C:
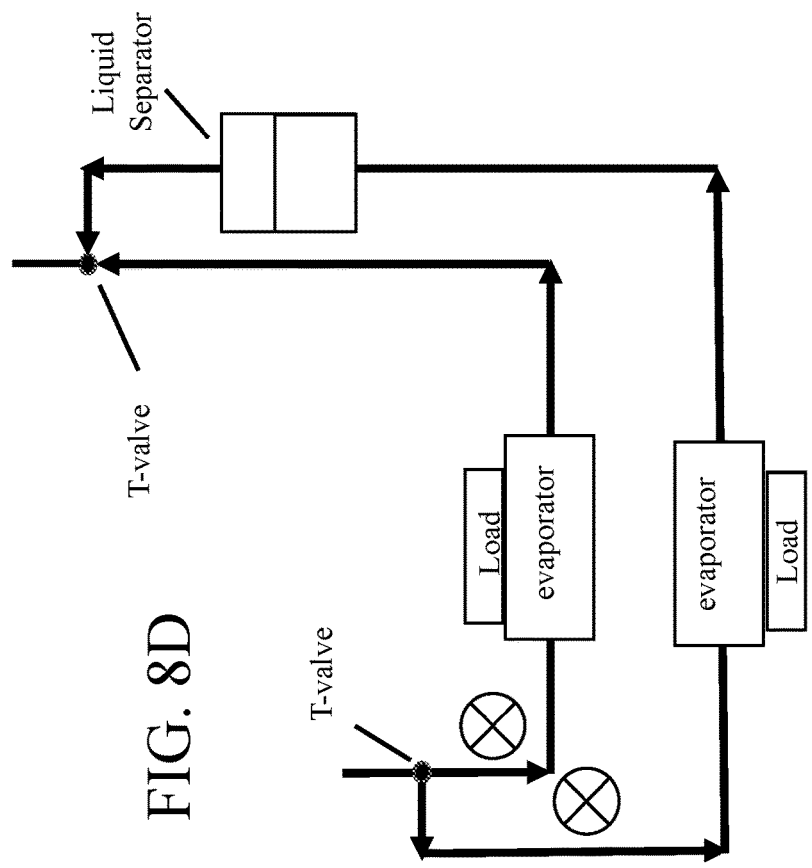
Figure 8D:
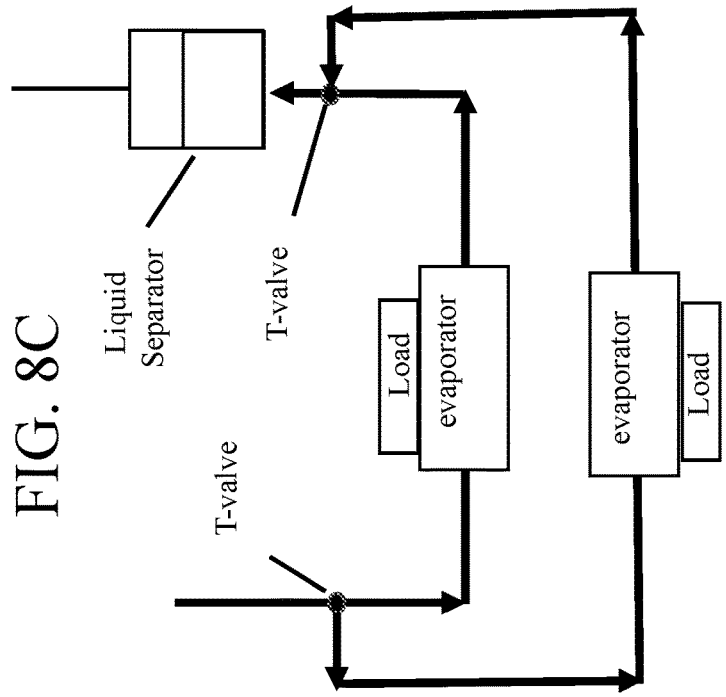

FIG. 8 shows one example of the closed circuit refrigeration system that is integrated with the open circuit refrigeration system. Using the system of FIG. 4, as an example, by integrated is meant that the closed circuit system includes the receiver 32, the control device 41 (i.e., an expansion valve device), an evaporator arrangement 87 that accommodates the two loads, a liquid separator 88 having a vapor side port and a liquid side port, a junction device, a compressor 89, and a condenser 90, all of which are coupled via conduits (not referenced). In some implementations of the closed circuit system includes an oil return path (not shown) used for lubrication of the compressor 89. The open circuit refrigeration system includes the receiver 32, the control device 41 (i.e., expansion valve device), the evaporator arrangement 87, the liquid separator 88, the junction device and the back pressure regulator 48 that is coupled to exhaust line 12. Controlling the back pressure regulator 48 causes the open circuit system to operate. The evaporator arrangement 87 can be of various constructions. One construction (FIG. 8A) would have two loads in thermal contact to a single evaporator in the evaporator arrangement 87. Another construction (FIG. 8B) would have two evaporators with one or two loads in thermal contact to each evaporator in the evaporator arrangement 87. Another construction (FIG. 8C) would have two evaporators each in thermal contact with a load, which are coupled in parallel, with optional expansion devices (FIG. 8D) at inlets to the evaporators.

VIII. Hardware and Software Implementations

Figure 9:
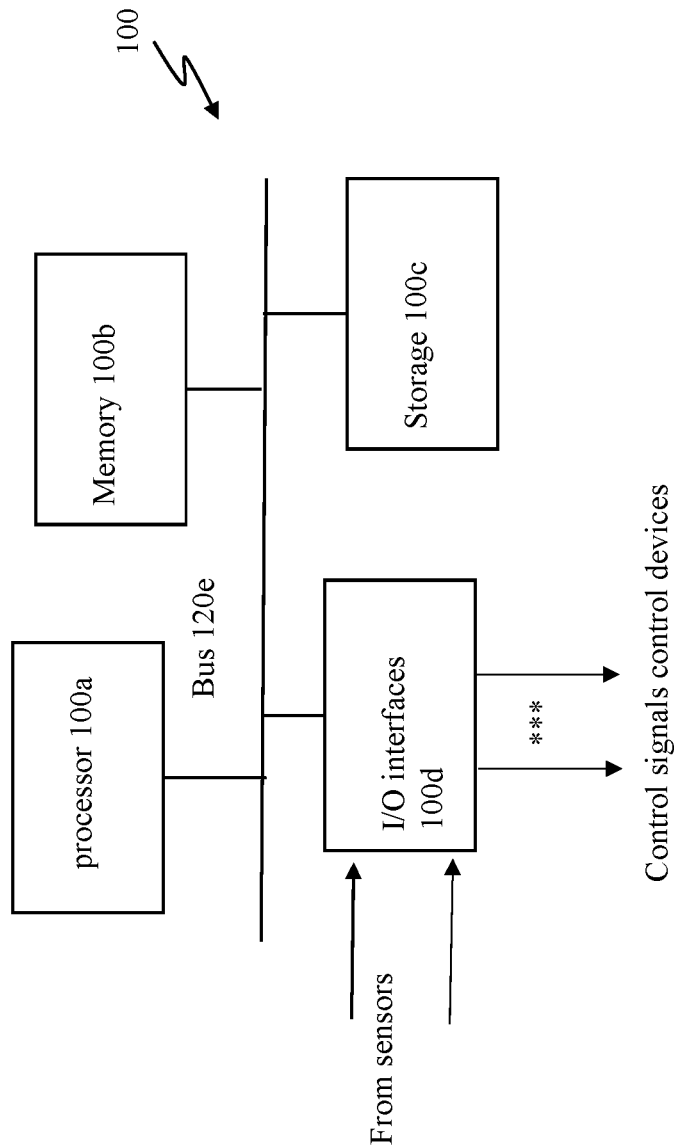
FIG. 9 is a block diagram of a controller system.

FIG. 9 shows a controller 100 that can be included to control any one of the control devices of any of the open circuit refrigeration systems discussed above. The controller 100 includes various electrical or electronic computing or processing devices, and can perform any combination of the various steps discussed above to control various components of the disclosed thermal management systems. The controller can also be included to further control discharge of vapor from the OCRS'.

Sensor devices (not shown) can be included in any of the OCRS systems. These sensor devices measure a thermodynamic property of the system 10, e.g., refrigerant pressure, temperature, etc. These measures are sent as sensor signals to the controller 100, which process these signals to produce control signals to control the aforementioned control devices.

Controller 100 can generally, and optionally, include any one or more of a processor (or multiple processors) 100a, a memory 100b, a storage device 100c, and input/output device 100d. Some or all of these components can be interconnected using a system bus 100e. The processor is capable of processing instructions for execution. In some embodiments, the processor 100a can be a single-threaded processor. In certain embodiments, the processor 100a can be a multi-threaded processor. Typically, the processor 100a is capable of processing instructions stored in the memory or on the storage device to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory 100b stores information within the system, and can be a computer-readable medium, such as a volatile or non-volatile memory. The storage device 100c can be capable of providing mass storage for the controller 100. In general, the storage device 100c can include any non-transitory tangible media configured to store computer readable instructions. For example, the storage device can include a computer-readable medium and associated components, including: magnetic disks, such as internal hard disks and removable disks; magneto-optical disks; and optical disks. Storage devices 100c suitable for tangibly embodying computer program instructions and data in a tangible media, also include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output device 100d provides input/output operations for controller 100, and can include a keyboard and/or pointing device. In some embodiments, the input/output device includes a display unit for displaying graphical user interfaces and system related information. Not shown, but which could be included, is one or more network interfaces.

The features described herein, including components for performing various measurement, monitoring, control, and communication functions, can be implemented in digital electronic circuitry, or in computer hardware, firmware, or in combinations of the foregoing. Methods steps can be implemented in a computer program product tangibly embodied in an information carrier, e.g., in a machine-readable storage device, for execution by a programmable processor (e.g., of controller 100), and features can be performed by a programmable processor executing such a program of instructions to perform any of the steps and functions described above. Computer programs suitable for execution by one or more system processors include a set of instructions that can be used, directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

In addition to one or more processors and/or computing components implemented as part of controller 100, the systems disclosed herein can include additional processors and/or computing components within any of the control device (e.g., first control device 41, 42, 48, 55) and any of the sensors discussed above. Processors and/or computing components of the control device and sensors, and software programs and instructions that are executed by such processors and/or computing components, can generally have any of the features discussed above in connection with controller 100.

OTHER EMBODIMENTS

A number of embodiments have been described. For example, in each of the basic open circuit configurations, various modifications/additions are possible, such as employing plural evaporators, some of which can operate with a superheat, or using a recuperative heat exchanger for transferring heat energy from refrigerant fluid emerging from evaporator to refrigerant fluid upstream from a control device between the receiver and the evaporator. Other combinations of these basic open circuit configurations are feasible. In addition, other platforms (vehicles) could include the high heat loads cooled by open circuit refrigeration systems that discharge refrigerant vapor that is processed according to the principles discussed herein. Nevertheless, it will be understood that various modifications may be made to the open circuit refrigeration systems and/or the disposal processing without departing from the spirit and scope of the disclosure. Accordingly, other embodiments are within the scope of the following claims.

What is claimed is:

1. An airborne vehicle comprising:
    a reaction engine that produces a jet stream of discharged reaction mass to provide thrust for the airborne vehicle;
    an exhaust nozzle coupled to a jet stream exit of the reaction engine; and
    a thermal management system, comprising:
        a thermal load comprising temperature-sensitive electronics;
        a refrigerant receiver configured to store at least a portion of a refrigerant fluid as a refrigerant liquid;
        an open circuit refrigeration system including an exhaust line, the open circuit refrigeration system configured to remove heat from the thermal load and regulate a temperature of the thermal load to within a predetermined range of operating temperatures, by transferring the removed heat to the refrigerant liquid in the open circuit refrigeration system and causing a phase change of the refrigerant liquid into a refrigerant vapor, and exhaust the refrigerant vapor into the exhaust line; and
        an exhaust port coupled to the airborne vehicle and to the exhaust line, the exhaust port receives the refrigerant vapor and discharges the received refrigerant vapor into the jet stream from operation of the reaction engine.

2. The airborne vehicle of claim 1, wherein the reaction engine is a jet engine and with the exhaust line of the open circuit refrigeration system coupled to the exhaust nozzle.

3. The airborne vehicle of claim 1, wherein the reaction engine is a jet engine and with the exhaust line of the open circuit refrigeration system coupled to the airborne vehicle at a location that is in proximity to and posterior to the combustion portion of the reaction engine.

4. The airborne vehicle of claim 1, wherein the reaction engine includes a turbine that is configured to provide thrust for the airborne vehicle, and the exhaust nozzle is coupled to the reaction engine after the turbine.

5. The airborne vehicle of claim 1, wherein the refrigerant liquid comprises ammonia.

6. The airborne vehicle of claim 1, wherein the temperature-sensitive electronics comprise a bank of one or more laser diodes.

7. The airborne vehicle of claim 1, wherein the refrigerant receiver is configured to store the refrigerant liquid in the form of liquid ammonia.

8. The airborne vehicle of claim 1, wherein the airborne vehicle carries a directed energy system that comprises a high-energy laser comprised of a bank of one or more laser diodes.

9. The airborne vehicle of claim 8, wherein the temperature-sensitive electronics comprise the bank of one or more laser diodes.

10. The airborne vehicle of claim 1, wherein the thermal management system further comprises a gas receiver fluidly coupled to the refrigerant receiver and configured to store the refrigerant fluid as a refrigerant vapor or gas.

11. The airborne vehicle of claim 10, wherein the gas receiver is arranged upstream of the exhaust port in a refrigerant fluid flow path of the thermal management system.

12. The airborne vehicle of claim 11, wherein the refrigerant receiver is configured to store the refrigerant liquid in the form of liquid ammonia.

13. The airborne vehicle of claim 10, wherein the thermal management system further comprises a flow control valve fluidly coupled between the gas receiver and the refrigerant receiver.

14. The airborne vehicle of claim 13, wherein the flow control valve is a first flow control valve, the thermal management system further comprising a second flow control valve fluidly coupled between the refrigerant receiver and an evaporator configured to remove the heat from the thermal load.

15. The airborne vehicle of claim 1, further comprising:
    an afterburner coupled to the reaction engine, the afterburner including a fuel spray mechanism that delivers reaction engine fuel to the afterburner.

16. The airborne vehicle of claim 15, wherein the exhaust port is coupled to the airborne vehicle at a location that is in proximity to but not connected to the afterburner.

17. The airborne vehicle of claim 16, wherein the refrigerant liquid comprises ammonia.

18. The airborne vehicle of claim 16, wherein the refrigerant receiver is configured to store the refrigerant liquid in the form of liquid ammonia.

19. The airborne vehicle of claim 16, wherein the refrigerant receiver is arranged upstream of the exhaust port in a refrigerant fluid flow path of the thermal management system.

20. The airborne vehicle of claim 15, wherein the exhaust port is coupled to the fuel spray mechanism in the afterburner.

21. An airborne vehicle comprising:
    a reaction engine that produces a jet stream of discharged reaction mass to provide thrust for the airborne vehicle;
    an exhaust nozzle coupled to a jet stream exit of the reaction engine; and
    a thermal management system, comprising:
        a thermal load comprising temperature-sensitive electronics;
        a refrigerant receiver configured to store ammonia fluid as ammonia refrigerant liquid;
        an open circuit refrigeration system including an exhaust line, the open circuit refrigeration system configured to remove heat from the thermal load and regulate a temperature of the thermal load to within a predetermined range of operating temperatures, by transferring the removed heat to the refrigerant liquid in the open circuit refrigeration system and causing a phase change of the refrigerant liquid into a refrigerant vapor, and exhaust the refrigerant vapor into the exhaust line; and
        an exhaust port coupled to the airborne vehicle and to the exhaust line, the exhaust port receives the refrigerant vapor and discharges the received refrigerant vapor into the jet stream from operation of the reaction engine.

22. The airborne vehicle of claim 21, wherein the reaction engine is a jet engine and with the exhaust line of the open circuit refrigeration system coupled to the exhaust nozzle.

23. The airborne vehicle of claim 21, wherein the reaction engine is a jet engine and with the exhaust line of the open circuit refrigeration system coupled to the airborne vehicle at a location that is in proximity to and posterior to the combustion portion of the reaction engine.

24. The airborne vehicle of claim 21, wherein the reaction engine includes a turbine that is configured to provide thrust for the airborne vehicle, and the exhaust nozzle is coupled to the reaction engine after the turbine.

25. The airborne vehicle of claim 21, wherein the refrigerant liquid comprises ammonia.

26. The airborne vehicle of claim 21, wherein the temperature-sensitive electronics comprise a bank of one or more laser diodes.

27. The airborne vehicle of claim 21, wherein the airborne vehicle carries a directed energy system that comprises a high-energy laser comprised of a bank of one or more laser diodes.

28. The airborne vehicle of claim 27, wherein the temperature-sensitive electronics comprise the bank of one or more laser diodes.

29. The airborne vehicle of claim 21, further comprising:
an afterburner coupled to the reaction engine, the afterburner including a fuel spray mechanism that delivers reaction engine fuel to the afterburner.

30. The airborne vehicle of claim 29, wherein the exhaust port is coupled to the airborne vehicle at a location that is in proximity to but not connected to the afterburner.

31. The airborne vehicle of claim 30, wherein the refrigerant receiver is arranged upstream of the exhaust port in a refrigerant fluid flow path of the thermal management system.

32. The airborne vehicle of claim 30, wherein the thermal management system further comprises a gas receiver fluidly coupled to the refrigerant receiver and configured to store ammonia vapor or gas.

33. The airborne vehicle of claim 32, wherein the gas receiver is arranged upstream of the exhaust port in a refrigerant fluid flow path of the thermal management system.

34. The airborne vehicle of claim 32, wherein the thermal management system further comprises a flow control valve fluidly coupled between the gas receiver and the refrigerant receiver.

35. The airborne vehicle of claim 34, wherein the flow control valve is a first flow control valve, the thermal management system further comprising a second flow control valve fluidly coupled between the refrigerant receiver and an evaporator configured to remove the heat from the thermal load.

36. The airborne vehicle of claim 29, wherein the exhaust port is coupled to the fuel spray mechanism in the afterburner.

* * * * *